United States Patent
Whitlow et al.

(10) Patent No.: US 9,558,669 B2
(45) Date of Patent: Jan. 31, 2017

(54) DATALINK MESSAGE PRIORITIZATION SYSTEM AND METHOD

(75) Inventors: Stephen Whitlow, St. Louis Park, MN (US); Michael Christian Dorneich, Saint Paul, MN (US); William Rogers, Minneapolis, MN (US); Chris Hamblin, League City, TX (US); Claudia Keinrath, Graz (AT); Thea L. Feyereisen, Hudson, WI (US)

(73) Assignee: Honeywell International, Inc., Morris Plains, NJ (US)

( * ) Notice: Subject to any disclaimer, the term of this patent is extended or adjusted under 35 U.S.C. 154(b) by 1569 days.

(21) Appl. No.: 13/007,178

(22) Filed: Jan. 14, 2011

(65) Prior Publication Data

US 2012/0075124 A1    Mar. 29, 2012

Related U.S. Application Data

(60) Provisional application No. 61/386,780, filed on Sep. 27, 2010.

(51) Int. Cl.
- *G01C 21/00* (2006.01)
- *G08G 5/00* (2006.01)
- *H04L 12/58* (2006.01)
- *H04L 29/08* (2006.01)

(52) U.S. Cl.
CPC ............ *G08G 5/0021* (2013.01); *H04L 51/26* (2013.01); *H04L 67/12* (2013.01)

(58) Field of Classification Search
CPC ......... H04L 67/12; H04L 51/26; H04L 67/00; H04L 47/10; G08G 5/0021; G08G 5/0026; G01C 23/00; G01C 23/005

USPC .................................. 340/945–983; 709/240
See application file for complete search history.

(56) References Cited

U.S. PATENT DOCUMENTS

| | | | |
|---|---|---|---|
| 5,689,419 A | 11/1997 | Massat | |
| 6,175,314 B1 | 1/2001 | Cobley | |
| 6,199,008 B1 | 3/2001 | Aratow et al. | |
| 6,262,659 B1* | 7/2001 | Korkosz et al. | 340/539.24 |
| 7,203,688 B2 | 4/2007 | Hopkins | |
| 7,385,527 B1 | 6/2008 | Clavier et al. | |
| 7,580,377 B2 | 8/2009 | Judd | |
| 2003/0006910 A1 | 1/2003 | Dame | |
| 2006/0029198 A1* | 2/2006 | Dorneich et al. | 379/88.22 |
| 2007/0255850 A1* | 11/2007 | Gould et al. | 709/240 |
| 2009/0089693 A1 | 4/2009 | Fahy | |
| 2010/0161157 A1* | 6/2010 | Guilley et al. | 701/3 |

OTHER PUBLICATIONS

EP Search Report, EP 11182265.6-1244 dated Nov. 24, 2011.
EP Communication, EP 11182265.6-1244 dated Dec. 14, 2011.

* cited by examiner

*Primary Examiner* — An T Nguyen
(74) *Attorney, Agent, or Firm* — Fogg & Powers LLC

(57) ABSTRACT

A system and method are provided for prioritizing incoming datalink messages. When a datalink message is received in an aircraft, it is parsed into individual information elements. The relevance of the received datalink message is then assessed from the individual information elements. The received datalink message is then categorized into one of a plurality of playback priority categories, based on the assessed relevance of the received datalink message.

13 Claims, 3 Drawing Sheets

| MESSAGE RELEVANCE | TAKEOFF | | | CLIMB | | | CRUISE | | | DESCENT | | | LANDING | | | PHASE OF FLIGHT |
| --- | --- | --- | --- | --- | --- | --- | --- | --- | --- | --- | --- | --- | --- | --- | --- | --- |
| | LOW | MED | HIGH | LOW | MED | HIGH | LOW | MED | HIGH | LOW | MED | HIGH | LOW | MED | HIGH | PILOT WORKLOAD |
| NOT RELEVANT | D | F | F | D | F | F | P | P | D | D | F | F | D | F | F | |
| MEDIUM | D | D | D | P | D | D | P | P | P | P | D | D | D | D | D | |
| HIGH | P | D | D | P | D | D | P | P | P | P | D | D | P | D | D | |

| | |
| --- | --- |
| P | PLAY AUDIO VERSION IMMEDIATELY |
| D | DEFER AUDIO VERSION UNTIL LATER |
| F | FILTER OUT DATALINK MESSAGE, DO NOT PLAY |

FIG. 2

DATALINK MESSAGE PRIORITIZATION SYSTEM AND METHOD

PRIORITY CLAIMS

This application claims the benefit of U.S. Provisional Application No. 61/386,780 filed Sep. 27, 2010.

TECHNICAL FIELD

The present invention generally relates to datalink messaging, and more particularly relates to a system and method for parsing and prioritizing datalink messages received in an aircraft cockpit.

BACKGROUND

Datalink messaging provides an additional channel of communication for pilots, and provides enhanced information flow to and from the flight deck. Indeed, datalink messaging technologies are supplanting traditional radio transmissions as the primary means of communication between aircraft and ground facilities (e.g., air traffic control). However, datalink messaging may adversely impact pilot workload and attention. In particular, recent research suggests that pilot workload may increase due to increased interaction with a display device that is configured to render received datalink messages, and time spent creating, editing, and generally writing datalink messages. Moreover, frequent datalink messages may be a source of pilot distraction on the flight deck.

In addition to the above-mentioned potential impacts, it is postulated that increased datalink message usage could adversely impact pilot situation awareness due to the loss of what is generally known as the "party line effect." The party line effect refers to information pilots may overhear while monitoring radio communications between ground facilities and other aircraft in the same sector. Pilots often use this "party line information" to establish situational awareness of the air traffic around their own aircraft, to anticipate future instructions from ground facilities, and to obtain knowledge of potential atmospheric hazards.

Hence, there is a need for a system and method to effectively filter incoming datalink messages to support pilot situation awareness and without overloading the pilot with irrelevant and/or non-time-critical datalink messages and/or to tailor datalink message presentation to the current situation, to increase situation awareness and decrease potential information overload. The present invention addresses at least these needs.

BRIEF SUMMARY

In one embodiment, a method for prioritizing incoming datalink messages includes receiving a datalink message in an aircraft, parsing the received datalink message into individual information elements, assessing the relevance of the received datalink message from the individual information elements, categorizing the received datalink message into one of a plurality of playback priority categories, based on the assessed relevance of the received datalink message.

In another embodiment, a method for prioritizing incoming datalink messages includes receiving a datalink message in an aircraft, parsing the received datalink message into individual information elements, assessing the relevance of the received datalink message from the individual information elements, estimating pilot workload level, categorizing the received datalink message into one of a plurality of playback priority categories, based on the assessed relevance of the received datalink message and the estimated pilot workload level, and playing the received datalink message in accordance with its playback priority category.

In yet another embodiment, a datalink message prioritization system includes a receiver and a processor. The receiver is configured to receive datalink messages. The processor is in operable communication with the receiver and configured to parse each of the received datalink messages into individual information elements, assess the relevance of each of the received datalink messages from the individual information elements, and categorize each of the received datalink messages into one of a plurality of playback priority categories, based on its assessed relevance.

Furthermore, other desirable features and characteristics of the datalink message prioritization system and method will become apparent from the subsequent detailed description, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein:

FIG. 2 depicts a non-limiting example of at least a portion of a look-up table that may be used in the system of FIG. 1.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
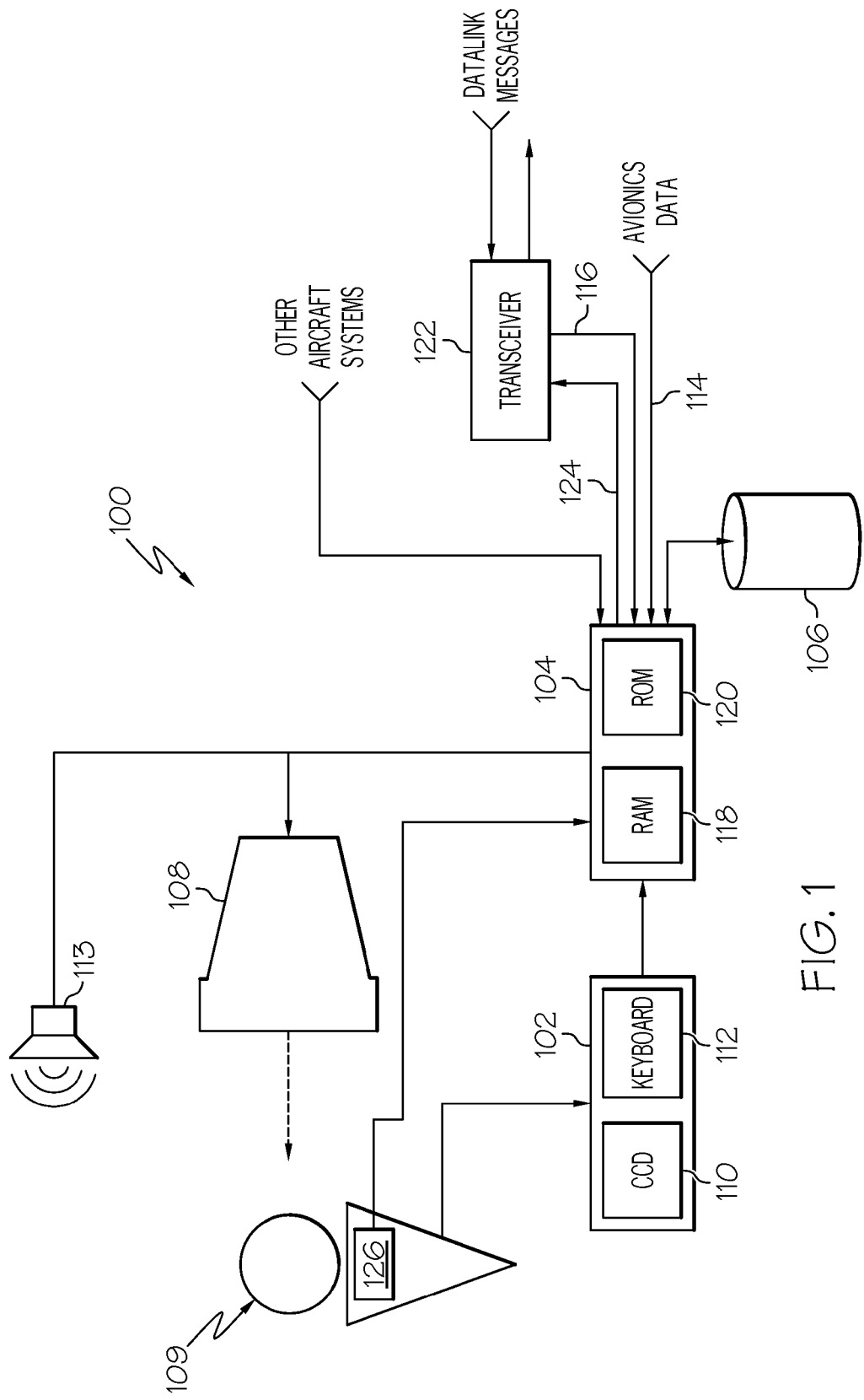
FIG. 1 depicts a functional block diagram of a portion of an example flight deck system.

Turning to FIG. 1, at least a portion of an exemplary datalink message prioritization system 100 is depicted and will now be described. The system 100, which is preferably implemented as part of a aircraft flight deck system, includes a user interface 102, a processor 104, one or more navigation databases 106, and a display 108. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 110, such as a mouse, a trackball, or joystick, and/or a keyboard, one or more buttons, switches, or knobs. In the depicted embodiment, the user interface 102 includes a CCD 110 and a keyboard 112. The pilot 109 may use the CCD 110 to, among other things, move a cursor symbol on the display screen, and may use the keyboard 112 to, among other things, input textual data for subsequent transmission.

The processor 104, as was just noted, is in operable communication with, and receives user input commands from, the user interface 102. The processor 104 is additionally in operable communication with the navigation databases 106, and with the display 108, and is coupled to receive various types of avionics data 114 from various remote systems and/or sensors (not illustrated), and to receive textual datalink messages 116. The processor 104 receives the user input commands supplied from the user interface 102 and is configured, in response to these user input commands, to selectively retrieve data from one or more of the navigation databases 106 and supply appropriate display commands to the display 108, so that the retrieved data is appropriately displayed on the display 108. The processor 104 is additionally configured to supply appropriate display commands to the display 108 so that the avionics data 114 may be selectively displayed on the display 108. As will be described further below, the processor 104 is additionally configured to process incoming datalink messages.

The processor 104 may be any one of numerous known general purpose microprocessors or an application specific processor that operates in response to program instructions. In the depicted embodiment, the processor 104 includes on-board RAM (random access memory) 118, and on-board ROM (read only memory) 120. The program instructions that control the processor 104 may be stored in either or both the RAM 118 and the ROM 120. For example, the operating system software may be stored in the ROM 120, whereas various operating mode software routines and various operational parameters may be stored in the RAM 118. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The navigation databases 106 include various types of navigation-related data. Such navigation-related data includes various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation database 106 is, for clarity and convenience, shown as being stored separate from the processor 104, the navigation database 106 could be loaded into the on-board RAM 118, or the navigation database 106 could be integrally formed as part of the processor 104, and/or RAM 118, and/or ROM 120. The navigation database 106 could also be part of a device or system that is physically separate from the datalink message prioritization system 100. The avionics data 114 that is supplied from remote systems and/or sensors includes data representative of the state of an aircraft such as, for example, aircraft speed, altitude, and heading.

Textual datalink messages are transmitted to the system 100 via, for example, modulated radio frequency (RF) signals. The textual datalink messages are received and demodulated by a receiver 122 (or transceiver), and are then supplied to the processor 104. The textual datalink messages 116 include data representative of various messages between ground stations (e.g., air traffic control stations) and the host aircraft, as well as other aircraft that may be within the same aircraft sector. Thus, the processor 104 further processes the textual datalink messages 116 and, as will be described further below, parses the messages and determines whether the message should be immediately rendered on the display 108 or stored for subsequent playback to the pilot 109. The processor 104 may also supply textual datalink messages 124 to the receiver/transceiver 122, which in turn modulates the textual datalink messages 124 and transmits the modulated textual datalink messages to, for example, an air traffic control station (not shown). In the depicted embodiment, the receiver/transceiver 122 is separate from the processor 104. However, it will be appreciated that the receiver/transceiver 122 could be implemented as part of the processor 104.

The display 108 is used to display various images and data, in both a graphical and a textual format, and to supply visual feedback to the pilot 109 in response to the user input commands supplied by the pilot 109 to the user interface 102. It will be appreciated that the display 108 may be any one of numerous known displays suitable for rendering image and/or text data in a format viewable by the pilot 109. Non-limiting examples of such displays include various cathode ray tube (CRT) displays, and various flat panel displays such as, various types of LCD (liquid crystal display) and TFT (thin film transistor) displays.

The system 100 may also include one or more audio output devices 113 (only one depicted), which may be variously implemented. No matter the specific implementation, each audio output device 113 is preferably in operable communication with the processor 104. The processor 104, other non-depicted circuits or devices, supplies analog audio signals to the audio output devices 113. The audio output devices 113, in response to the analog audio signals, generate audible sounds. The audible sounds may include speech (actual or synthetic) or generic sounds or tones associated with alerts and notifications. Depending on the type of information contained within the datalink message, the information could be superimposed on existing displays such as the navigation display to present it within the context of the current flight plan to support pilot assessment of its impact.

As noted above, the system 100, and more particularly the processor 104, is preferably configured to parse incoming datalink messages 116. This is done in order to assess the priority of the incoming datalink messages, and to reason on the relevance of the incoming datalink messages. The system 100 may additionally be configured to estimate pilot workload and/or cognitive state. It is noted that pilot workload and/or cognitive state may be variously estimated. That is, these states may be estimated from direct physiological sensing or indirect assessment from interaction with the flight deck. For example, the pilot 109 may have one or more workload and/or cognitive state sensors 126 located on his or her body, clothing, and/or other device (e.g., helmet, eye wear). The workload and/or cognitive state sensor devices 126, which may be variously implemented, are configured to sense and supply physiological data and/or contextual data and/or various other relevant data to the processor 104. The sensor devices 126 may be located on the body and/or clothing of the pilot 109, and/or on one or more other devices (e.g., helmet, eye wear) worn by the pilot 109. Alternatively, the sensor devices 126 may be disposed nearby the pilot 109.

It will be appreciated that the number and type of sensor devices 126 may vary. Some non-limiting examples of suitable physiological sensor devices 126 include an electroencephalogram (EEG) sensor, an electrocardiogram (ECG) sensor, an electrooculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in the pilot.

The EEG sensors monitor the pilot's and co-pilot's brain wave activity by sensing electrical potential at the scalp. Measurements by the EEG sensors are categorized into frequency bands, including delta, theta, alpha, and beta. For example, the delta band ranging from 1-4 Hz indicates a state of unconsciousness, the theta band ranging from 4-8 Hz indicates a state of daydreaming, the alpha band ranging from 8-13 Hz indicates an alert, but not mentally busy state, and the beta band ranging from 13-30 Hz indicates a state of higher thought process. Other frequency bands are possible. Based on the location of the EEG sensors, and the dominant frequencies detected, EEG data may help evaluate the type and amount of mental activity of the pilot 109. For example, if there are significant brain waves measured in the frontal brain, the pilot 109 may be actively manipulating information within their working memory. As a result, the EEG sensor may be used to measure the cognitive state of the pilot 109.

Other physiological sensors mentioned above include ECG sensors, EOG sensors, ZPG sensors, GSR sensors, pupilometry sensors, visual scanning sensors, blood oxygenation sensors, BVP sensors, EMG sensors, blood pressure sensors, and near-infrared optical brain imaging sensors. The ECG sensors measure heart rate by detecting electrical activity of the heart muscle. The EOG sensors measure eye movement by detecting electrical changes between the front and back of the eye as the eye moves. The ZPG sensors (or other type of respiration sensors) measure lung capacity and can be used to determine whether the pilot 109 is having difficulty breathing. The GSR sensors measure changes in conductivity of the skin caused by sweating and saturation of skin ducts prior to sweating. The pupilometry sensors measure pupil dilation to determine the level of engagement or interest in a task, or cognitive load of a task. The visual scanning sensors measure scanning behavior and dwell time to provide insight into visual attention. The blood oxygenation sensors sense oxygen levels in the blood. The BVP sensors measure heart rate by detecting changes in blood volume at a given location of the body. The EMG sensors measure currents associated with muscle action. The near-infrared optical brain imaging sensors measure brain function.

The sensor devices 126 may additionally include an accelerometer, an eye tracker, or any other device that can sense contextual data. The sensor devices 126 may be commercial off-the-shelf devices or custom designed. The accelerometers, if included, measure the rate at which an object is moving, the acoustic sensors, if included, measure the loudness and frequency of ambient sounds, and the eye trackers, if included, measure pupilometry and/or visual scanning behavior. Data from the accelerometers may be used to measure head movement such as yaw, pitch, and roll. Data from the eye trackers may be used to infer cognitive state from pupil dilation response and to infer visual attention indices from dwell time and scanning patterns.

No matter the specific number and type of sensor devices 126 used, each sensor devices 126 supplies data representative of the measured stimuli to the processor 104. It will be appreciated that the data may be transmitted to the processor 104 wirelessly or via hard-wired connections, and that the data may be modified, prior to transmission, to format the data as needed. The processor 104, upon receipt of the sensor data, estimates the workload level and/or cognitive state of the pilot 109. It will be appreciated that the workload level and/or cognitive state may be estimated using any one of numerous known methods. An example of one particular methodology is disclosed in U.S. Pat. No. 7,454,313, entitled "Hierarchical Workload Monitoring for Optimal Subordinate Tasking," which is assigned to the assignee of the instant invention.

The processor 104 may also, or instead, receive data from aircraft sensors (e.g., altitude, speed, heading), data from aircraft systems (e.g., TCAS, FMS), and various other data types (e.g., phase of flight, pilot experience, etc), and use these data, in addition to or instead of the data from the sensor devices 126, to determine current and future pilot workload level. Moreover, the processor 104 may be configured to estimate current and future pilot workload level and/or cognitive state from secondary (i.e., non-direct) sources, such as tracking response times to various stimuli (e.g., alerts) or performance on tasks.

The processor 104 is further configured, based on the estimated workload, and datalink message relevance and priority, to select the optimum manner to handle the current datalink messages. In some embodiments, the processor 104 may selectively defer messages to be "played back" to the pilot 109 at a later time. As used herein, the terms "playing," "play back," "plays back," and "played back" include audible play back, visual play back, tactile play back, and various combinations of audible, visual, and tactile. This allows relatively lower priority messages to be played back during relatively lower workload periods to help balance pilot workload and maintain situational awareness from datalink messages. The processor 104 may thus be configured to at least selectively convert high priority incoming datalink messages into auditory messages that may be subsequently played back to the pilot 109 if the pilot 109 is engaged in relatively high workload activities that may or may not involve visual attention. Conversely, this capability could also be used to play back all datalink messages to keep a drowsy and/or inattentive pilot 109 engaged during cruise operations. The processor 104 defers messages by converting them to audio messages that may be played back at a later time when the pilot workload level is relatively low. The processor 104 could also filter out messages that are deemed irrelevant. This additional functionality, if included, decreases the likelihood of pilot information overload, without sacrificing situation awareness. Preferably, this capability, if included, is applied judiciously to ensure pilot situational awareness is not compromised.

The processor 104 estimates the relevance of received datalink messages by first parsing the incoming datalink messages. For datalink messages in a known format, such as ATIS, SIGMET, AIRMET, NOTAMS, and METARS, the messages are parsed into individual information elements. The information elements may then be extracted to populate parameters that can be compared to the host aircraft flight information. If the datalink message is in a free text format, the processor 104 may be configured to populate the parameters via any one of numerous known text analysis methods. Some non-limiting examples include text analyses that are commonly used by internet search engines to identify similar searches and display advertisements similar to a user's search terms. Other non-limiting text analysis techniques include log entropy-based statistical analysis and latent semantic indexing to compute relationships between key terms contained within the message, and subsequent comparison to the flight plan onboard the host aircraft.

No matter the specific manner in which the incoming datalink messages are parsed, the processor 104 is further configured to determine the relative relevance of the messages by, for example, comparing the above-mentioned populated parameters to aircraft and flight information, for example, within the flight management system (FMS). This relevance determination may be variously implemented. For example, relevance may be determined based on parameters such as location, temporal contiguity, and general information-type priority. In one particular embodiment, the processor 104 is configured to determine message relevance using heuristic analyses based on predetermined parameters. Preferably, the processor 104 performs rudimentary reasoning on spatial, temporal, and information elements of the datalink messages that compares the incoming message elements to the current flight status and flight plan. For example, the system 100 may be configured to reason on one or more of phase of flight, current position, current pilot task load, and directly-sensed (or indirectly-sensed) pilot cognitive states.

As one non-limiting example of relevance determination, a NOTAMS for an inoperable radio navigational aid that is behind the current flight position or does not intersect the current flight plan may be considered lower priority than a NOTAMS for a hazard location that intersects the current flight plan in the near future. As another non-limiting example, an ATIS datalink message for an airport that is behind the current flight location and current flight plan may be considered lower priority, than a datalink message to another aircraft that is being routed around weather that will intersect the current flight plan in the near future.

The system 100 may, in some embodiments, be configured as a policy-based system where, the system response is specified in human-understandable policies that are statements that include parsed information categories and logical operators. The policy logic may be supported by a software construct, such as a look-up table, that specifies system 100 response based on message relevance, pilot workload, and phase of flight. The table or other software construct may be stored in the RAM 118, ROM 120, or other non-depicted memory storage device, and may be updated, either periodically or as needed, based on airline and/or pilot preference. An example embodiment of a software look-up table is depicted in FIG. 2. It will be appreciated, however, that various other constructs, representations, and response assignments could also be used.

The system 100 is also preferably configured to implement what is referred to herein as a "smart party line." With this functionality, the system 100 monitors datalink message transmissions between all aircraft and ground stations within range of the host aircraft, identifies messages that are relevant to the aircraft, and selectively plays back the messages based on pilot workload and message context. At least in some embodiments, messages sent to other aircraft could be played back in a manner that distinguishes those messages from those that are directed to one's own aircraft. For example, the messages could be played back with a different "voice," or displayed in a different color, font, etc. The ability to monitor and filter datalink messages associated with other aircraft maintains the positive situational awareness aspects of the party line effect, while eliminating potentially distracting elements such as irrelevant communications.

The smart party line functionality provides the additional capability of being able to prioritize and reschedule message delivery based on pilot workload. For instance, during relatively low workload periods, party line datalink messages may be converted to voice and played back to the pilot 109 as a simulated party line. During relatively high workload periods, less relevant messages may be delayed, inhibited, or suppressed until pilot workload is sufficiently reduced. The smart party line functionality may, for example, suppress those messages that were not intended for the aircraft since there would not be a cost to not presenting them in terms of pilot situation awareness. However, datalink messages to other aircraft that may enhance situational awareness may, in some embodiments, be played back immediately, depending upon pilot workload.

As with the datalink messages associated with the host aircraft, the processor 104 is configured to first parse party line datalink messages to populate predetermined parameters of comparison. Once the parameters of comparison have been populated, the processor 104 determines the relevance of the party line datalink messages to the host aircraft. The relevance determination may be implemented by, for example, using multiple classes of special purpose reasoners to estimate relevance for multiple classes of information. For example, when party line datalink messages are communicating weather or hazard information, a spatial reasoner may be used to determine how relevant this information is to the host aircraft based on proximity to a 4D flight plan. For party line datalink messages providing updated clearances to other aircraft in the host aircraft sector, the processor 104 will first determine whether a given clearance intersects the spatial-temporal profile of the host aircraft flight plan. The processor 104 will then reason on clearance details to evaluate whether the updated clearance reflects a situation that will be relevant to the host aircraft in the future. For example, if the party line datalink messages are re-routing aircraft that are ahead of the host aircraft, but the host aircraft has not yet been re-routed, the processor 104 may identify this class of party line datalink messages as relevant and would generate the message via the audio output device 113 and/or render the message on the display 108.

As outlined above, the "smart party line" functionality of the system 100 receives datalink messages transmitted to other aircraft (referred to herein as "party line datalink messages"), and analyzes these messages to determine the relevance thereof to the host aircraft. The party line datalink messages are then categorized based on their relevance, and displayed or suppressed accordingly. In general, highly relevant messages may be played back, depending on pilot workload level, while less relevant messages are suppressed. The threshold for determining which messages to play back may be determined based on various data such as, for example, pilot workload or likely task loading. In some embodiments, party line datalink messages may be completely suppressed during relatively high workload periods. In other embodiments, a synopsis of the party line datalink messages that were received and suppressed during relatively high workload periods may be developed for later presentation once workload has lowered. This functionality is preferably sensitive to the time criticality of party line datalink messages as well as tracking the "freshness" of information so earlier message parameters would be updated by later messages.

As may be appreciated, during relatively lower workload periods, the system 100 may be configured to suppress relatively fewer party line datalink messages. As a result, the pilot 109 may be kept engaged during such periods, which can reduce pilot fatigue and inattention. In some embodiments, for example, during low workload periods all relevant party line datalink messages may be displayed to the pilot 109.

In addition to maintaining the positive situational awareness attributed to the party line effect, the system 100 may also be configured to selectively change communication mediums based on pilot workload. During relatively low workload periods, relevant party line datalink messages could be converted to audio messages, thus offloading pilot visual and physical workload and reducing the head-down time associated with viewing and reading a message on the display 108.

The general methodology of the datalink message prioritization system 100 that was described above is depicted in flowchart form in FIG. 3. For completeness, a description of this method 300 will now be provided. In doing so, it is noted that the parenthetical references refer to like-numbered flowchart blocks.

Figure 3:
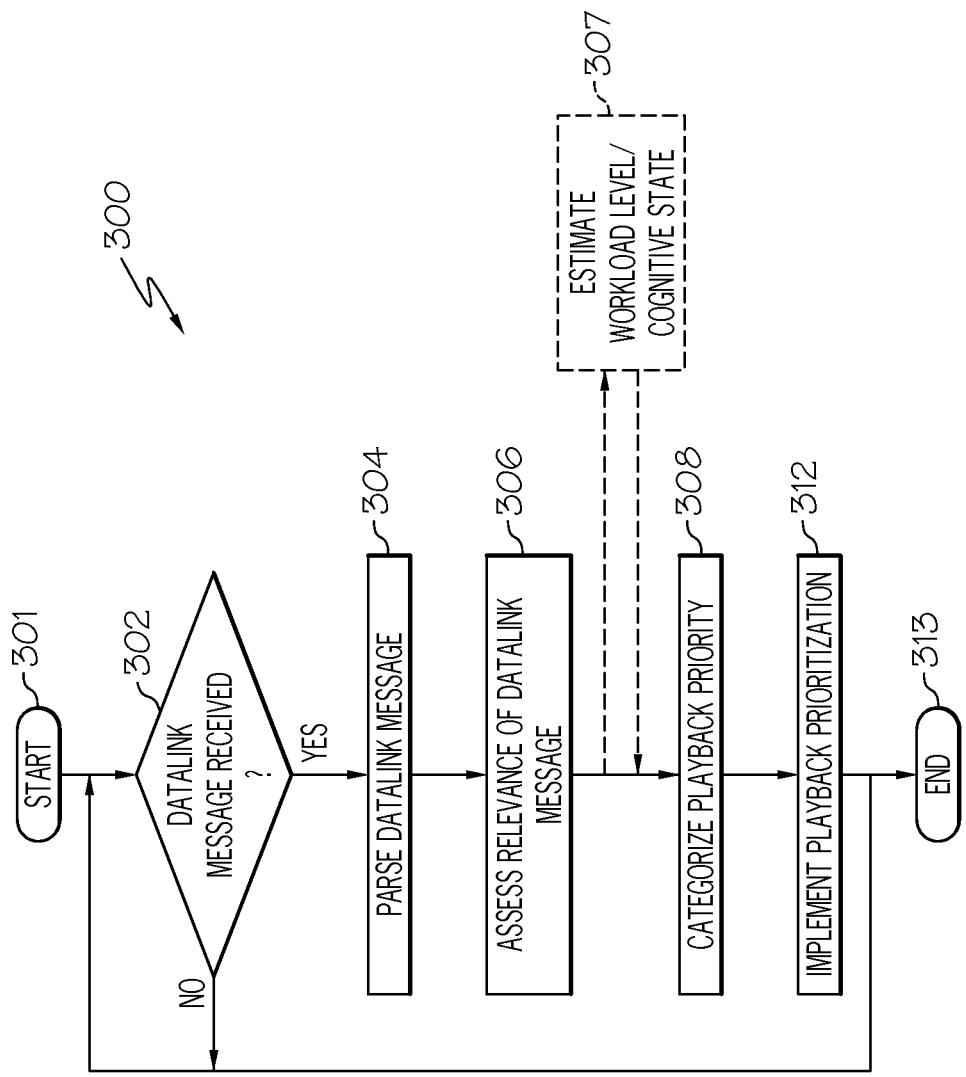
FIG. 3 depicts a process, in flowchart form, that may be implemented in the flight deck system of FIG. 1.

The method 300 begins by awaiting the receipt of a datalink message (302). As noted above, a received datalink message may be one that is transmitted to, and associated with, the aircraft in which the system 100 is installed, or it may be transmitted to, and associated with, another aircraft. In either case, when a datalink message is received, it is supplied to the processor 104. The processor 104 then parses the datalink message (304), assesses its relevance (306), and categorizes it into a playback category (308). As FIG. 3 depicts in phantom, the method 300 may also include estimating the pilot workload level and/or cognitive state (307), prior to categorizing the datalink message into a playback category. Whether or not pilot workload and/or cognitive state are assessed, the received datalink message is then played back in accordance with its playback priority category (312).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A method for prioritizing incoming datalink messages, comprising the steps of:
   receiving a datalink message in an aircraft;
   parsing the received datalink message into individual information elements;
   extracting the individual information elements to populate parameters;
   comparing the parameters to aircraft and flight information;
   assessing the relevance of the received datalink message from the comparisons;
   estimating both current and future workload level of a pilot; and
   categorizing the received datalink message into one of a plurality of playback priority categories, based on the assessed relevance of the received datalink message and additionally on the estimated current and future workload level of the pilot.

2. The method of claim 1, further comprising:
   playing the received datalink message in accordance with its playback priority category.

3. The method of claim 2, wherein the step of playing the received datalink message comprises playing an audio version of the received datalink message, rendering the received datalink message on a display device, or both.

4. The method of claim 1, further comprising:
   estimating pilot cognitive state; and
   categorizing the received datalink message into one of the plurality of playback priority categories based additionally on the estimated pilot cognitive state.

5. The method of claim 1, wherein the plurality of playback priority categories include:
   immediate playback;
   defer playback; and
   do not playback.

6. The method of claim 1, wherein the received datalink message is a datalink message transmitted to, and associated with, another aircraft.

7. A datalink message prioritization system, comprising:
   a receiver configured to receive datalink messages;
   a plurality of workload sensors, each workload sensor configured to (i) sense a parameter representative of pilot workload level and (ii) supply sensor data representative thereof; and
   a processor in operable communication with the receiver and the plurality of workload sensors, the processor coupled to receive the datalink messages and the sensor data and further coupled to receive aircraft and flight information, the processor configured to:
      parse each of the received datalink messages into individual information elements;
      extract the individual information elements to populate parameters;
      compare the parameters to the aircraft and flight information;
      assess the relevance of each of the received datalink messages from the comparisons;
      estimate both current and future workload level of a pilot; and
      categorize each of the received datalink messages into one of a plurality of playback priority categories, based on its assessed relevance.

8. The system of claim 7, wherein the processor is further configured to:
   play the received datalink messages in accordance with its playback priority category.

9. The system of claim 8, wherein:
   the processor is further configured to generate an audio version of one or more of the received datalink messages and supply audio signals representative thereof; and
   the system further comprises an audio output device coupled to receive the audio signals from the processor and configured, in response thereto, to generate audible sounds representative thereof.

10. The system of claim 8, wherein:
    the processor is further configured to generate and supply display commands representative of one or more of the received datalink messages; and
    the system further comprises display device coupled to receive the display commands from the processor and configured, in response thereto, to render the one or more received datalink messages thereon.

11. The system of claim 7, further comprising:
    a plurality of cognitive state sensors, each cognitive state sensor configured to (i) sense a parameter representative of pilot cognitive state and (ii) supply sensor data representative thereof to the processor,
    wherein the processor is further configured to (i) estimate pilot cognitive state from the sensor data and (ii) categorize the received datalink message into one of the plurality of playback priority categories based additionally on the estimated pilot cognitive state.

12. The system of claim 7, wherein:
    the plurality of playback priority categories include (i) immediate playback, (ii) defer playback, and (iii) do not playback;
    the system further comprises a memory storage device; and
    the processor is further configured to supply datalink messages in the defer playback category to the memory storage device for storage therein.

13. The system of claim 7, wherein one or more of the received datalink messages are datalink messages transmitted to, and associated with, another aircraft.

* * * * *